(12) United States Patent
Kim et al.

(10) Patent No.: US 10,715,602 B2
(45) Date of Patent: Jul. 14, 2020

(54) ADAPTIVE INTERNET-OF-THINGS SERVICE SYSTEM USING DETACHABLE/ATTACHABLE HARDWARE MODULE

(71) Applicant: VITCON CO., LTD., Seoul (KR)

(72) Inventors: Min Gyu Kim, Seoul (KR); Dong Chan Lee, Seoul (KR)

(73) Assignee: VITCON CO., LTD., Seoul (KR)

( * ) Notice: Subject to any disclaimer, the term of this patent is extended or adjusted under 35 U.S.C. 154(b) by 0 days.

(21) Appl. No.: 16/348,530

(22) PCT Filed: May 30, 2018

(86) PCT No.: PCT/KR2018/006130
§ 371 (c)(1),
(2) Date: May 9, 2019

(87) PCT Pub. No.: WO2018/221949
PCT Pub. Date: Dec. 6, 2018

(65) Prior Publication Data
US 2019/0281118 A1 Sep. 12, 2019

(30) Foreign Application Priority Data
Jun. 1, 2017 (KR) ........................ 10-2017-0068189

(51) Int. Cl.
*H04L 29/08* (2006.01)
*G06F 8/61* (2018.01)
(Continued)

(52) U.S. Cl.
CPC ................ *H04L 67/12* (2013.01); *G06F 8/61* (2013.01); *G06F 8/65* (2013.01); *G06F 9/4411* (2013.01);
(Continued)

(58) Field of Classification Search
CPC ..... H04L 12/2803; H04L 12/2807–281; H04L 12/2814–18; H04L 12/2823–2825;
(Continued)

(56) References Cited

U.S. PATENT DOCUMENTS 6,101,555 A * 8/2000 Goshey ............. H04L 29/12113
709/212
2003/0204371 A1 * 10/2003 Sciamanna ......... G06F 11/0736
702/183
(Continued)

FOREIGN PATENT DOCUMENTS

KR   10-2010-0027936 A   3/2010
KR   10-1530185 B1       6/2015
(Continued)

*Primary Examiner* — Brendan Y Higa
(74) *Attorney, Agent, or Firm* — Novick, Kim & Lee, PLLC; Jae Youn Kim

(57) ABSTRACT

Provided is an adaptive IoT service system employing a removable hardware module. The system includes a peripheral device control module, a management server, an application program configuration manager, and a user terminal. The peripheral device control module is configured such that a control board thereof for controlling a corresponding one of IoT devices is mountable to and removable from a mainboard thereof. The management server relays real-time data transmitted from IoT devices, cumulative data, and type information to the user terminal, and relays and manages the data and information. The application configuration manager automatically constructs a user interface of the user terminal on the basis of the data managed by the management server. The system constructs a user interface in real time and automatically associates the IoT device with the application program in the user terminal.

4 Claims, 6 Drawing Sheets

(51) Int. Cl.
*G06F 8/65* (2018.01)
*G06F 13/40* (2006.01)
*H04L 12/24* (2006.01)
*G06F 9/4401* (2018.01)
*H04L 12/28* (2006.01)

(52) U.S. Cl.
CPC ........ *G06F 13/409* (2013.01); *G06F 13/4068* (2013.01); *H04L 12/2807* (2013.01); *H04L 12/2814* (2013.01); *H04L 29/08558* (2013.01); *H04L 41/082* (2013.01); *H04L 41/0803* (2013.01); *H04L 41/0809* (2013.01); *H04L 67/34* (2013.01); *G05B 2219/35029* (2013.01)

(58) Field of Classification Search
CPC ..... H04L 29/08558; H04L 41/08–0813; H04L 41/085–0859; H04L 41/12; H04L 41/20–22; H04L 67/02–025; H04L 67/12–125; H04L 67/34; G05B 19/00; G05B 19/08; G05B 19/056; G05B 2219/35029; G06F 8/60–61; G06F 9/44–4415; G06F 9/445; G06F 13/4063–4095; G06F 15/7867–7875; G06F 30/34
See application file for complete search history.

(56) References Cited

U.S. PATENT DOCUMENTS

| | | | |
|---|---|---|---|
| 2011/0162004 A1* | 6/2011 | Yerli | H04N 21/42202 725/37 |
| 2012/0019351 A1* | 1/2012 | Bougaev | G06F 11/3031 340/3.5 |
| 2012/0253480 A1* | 10/2012 | Abe | G08C 19/00 700/12 |
| 2015/0301521 A1* | 10/2015 | Byron | G05B 19/4183 700/108 |
| 2016/0112537 A1* | 4/2016 | Foo | G06F 13/102 709/217 |
| 2016/0210135 A1* | 7/2016 | Wroblewski | H04W 4/70 |
| 2018/0048987 A1* | 2/2018 | Morris | H04B 5/0037 |
| 2018/0198641 A1* | 7/2018 | Gilani | G08B 25/004 |
| 2019/0195788 A1* | 6/2019 | Liu | G06F 30/00 |

FOREIGN PATENT DOCUMENTS

| | | |
|---|---|---|
| KR | 10-2016-0005828 A | 1/2016 |
| KR | 10-2016-0147595 A | 12/2016 |
| KR | 10-2017-0022074 A | 3/2017 |

* cited by examiner

ADAPTIVE INTERNET-OF-THINGS SERVICE SYSTEM USING DETACHABLE/ATTACHABLE HARDWARE MODULE

TECHNICAL FIELD

The present invention relates to a hardware software integration framework for shortening the lead time of an IoT internet service system and its associated Internet-of-Things (IoT) control board and for facilitating maintenance of the system and control board. More particularly, the present invention relates to an adaptive IoT internet service system using a removable hardware module enabling an IoT device and an application program of a user terminal to be automatically associated.

BACKGROUND ART

Internet-of-Things (IoT) refers to a technology of connecting all devices to the Internet by building a control unit (i.e., computer chip) and a communication unit in each of the devices.

IoT devices refer to common devices or things having a built-in IoT function. For example, general home appliances such as CCTVs, lights, alarms, refrigerators, air-conditioning devices can be IoT devices. In addition, various sensors that are commonly found in industrial sites, security devices, transformers, circuit breakers, energy storage devices, medical devices, factory automation devices, etc. also can be IoT devices.

Users can control IoT devices remotely from their IoT-based user terminals. User terminals and IoT devices are connected via various communication networks such as home networks, wireless communication networks, and short-range communication networks. Users are given authority to access and control IoT devices.

One of the key components for enabling users to remotely control various IoT devices from their user terminals is a controller for controlling an IoT device. Most frequently used controllers are a programmable logic controller (PLC) and an application-specific control board which is configured such that an electronic component such as a microcontroller unit (MCU) is mounted on a printed circuit board (PCB).

While an application-specific control board is a customized controller that is designed and manufactured according to the specifications required by an electric/electronic product in which the control board is to be built, a PLC is a general-purpose control board in which extra relays, DC inputs, contact inputs, and analog input terminals are included.

Conventional application-specific control boards for implementing an IoT service are designed and manufactured according to the types and the number of peripherals (for example, sensors, actuators, and valves) to be used in a specific IoT environment. Accordingly, a conventional application-specific control board has a problem in that the circuit thereof needs to be redesigned or replaced every time a new IoT device is added to the existing IoT environment or each existing IoT device is upgraded.

On the other hand, in the case of PLCs that are programmed using a ladder logic which is a programming language in the form of a graphical user interface (GUI), they are advantageous in that they can be relatively easily modified when there is a change in use of an existing device and their function can be easily extended.

As described above, conventionally, extension of functions and maintenance of control boards are burdensome and costly. Therefore, once an IoT environment is established, the IoT environment is continuously used as it is without addition of new IoT devices to the existing IoT device or modification to the existing IoT devices.

DISCLOSURE

Technical Problem

The present invention has been made to solve the problems occurring in the conventional art. According to the present invention, when a peripheral device is added to a control board to control an IoT device in an existing IoT environment, the peripheral device can be mounted to the control board without changing the existing hardware configuration of the control board. An object of the present is to provide an adaptive IoT service system employing a removable hardware module that enables a new peripheral device to be automatically associated with an application program installed in a user terminal, thereby improving the extendibility of a control board and shortening the time for development or modification of hardware and software modules.

Technical Solution

In order to accomplish the above object, according to one embodiment of the present invention, an adaptive IoT service system employing a removable hardware module includes: a control board configured to allow a hardware module for controlling a peripheral device connected with an IoT device to be mounted to and separated from a mainboard as necessary; a management server configured to store hardware-related information including types and positions of hardware modules controlling IoT devices connected to the control board, and updates the hardware-related information when a new IoT device is added or a change in an existing IoT device occurs; and a user terminal configured to control the added new IoT device remotely by receiving a drive program and control information from the management server and installing the drive program and applying the control information to an existing application program.

Specifically, the system may further include an over-the-air (OTA) programming boot loader that includes a communication module that enables connection to an IoT device and a removable hardware module that can be mounted to and removed from the control board according to a type of an IoT device to be controlled. The OTA boot loader enables automatic updating of a firmware over the air every when a type of a mountable hardware module or a control method is added.

In addition, the system may further include a server and a terminal application software for automatically generating a user interface according to the identification number of an IoT device and peripheral device type information issued by the firmware embedded in an MCU of the control board.

The control board of the present invention is configured such that a hardware module selected according to a peripheral device type can be mounted to and removed from the control board as necessary. A widget displayed on the user terminal may be automatically updated according to the type of the hardware module connected to the control board, and this automatic updating may be performed by the boot loader incorporated in the MCU of the control board, an OTA server, and the communication module.

Using the automatically generated widget, a user can check the information on the IoT device in real time, change the settings of the IoT device, and control the peripheral device associated with the IoT device. A command input through the widget may be transmitted to the IoT device via an IoT server. Similarly, the status information issued by the IoT device may be stored in the IoT server and displayed within the widget of the user terminal.

Advantageous Effects

The adaptive IoT service system employing a removable hardware module having various technical features, according to the embodiment of the present invention, has advantages described below.

First, when a removable modular control board according to the present invention is used in combination with an OTA service, it is easy to maintain and repair software when the hardware configuration of an IoT device is changed. This minimizes labor and cost for adding a sensor or a control module to an IoT device that is already in possession or newly purchased by a user.

In particular, when at least one of various sensors, lights, and machines used in smart farms or factories is added or replaced, the existing control board is maintained and only a control module that is mounted on the control board and associated with a peripheral device that is changed will be replaced. In this case, a control software program is automatically updated. Therefore, the components used in the smart farms or factors and the manufacturing process can be easily changed. In addition, when a trial-and-error activity is made to find the optimum process by collecting and managing production information by using IoT devices, the trial-and-error activity can by performed many times without significant changes in software, hardware, and machines.

In addition, the removable modular control board according to the present invention has the advantage of low cost which is the feature of application-specific control boards. It also has the advantages of flexible extension and easy maintenance that are features of PLCs. Further, it is also advantageous over application-specific control boards and PLCs in terms of having high compatibility with various peripheral devices.

BEST MODE

The above and other objects, features, and advantages of the present invention will become apparent to those skilled in the art from the exemplary embodiments described below and the attached drawings, so that those skilled in the art can implement the technical sprit of the present invention on the basis of the description provided below. Further, in describing the exemplary embodiments of the present invention, well-known functions or constructions will not be described in detail since they may obscure the gist of the present invention. Hereinafter, a preferred embodiment of the present invention will be described in detail with reference to the accompanying drawings.

Figure 2:
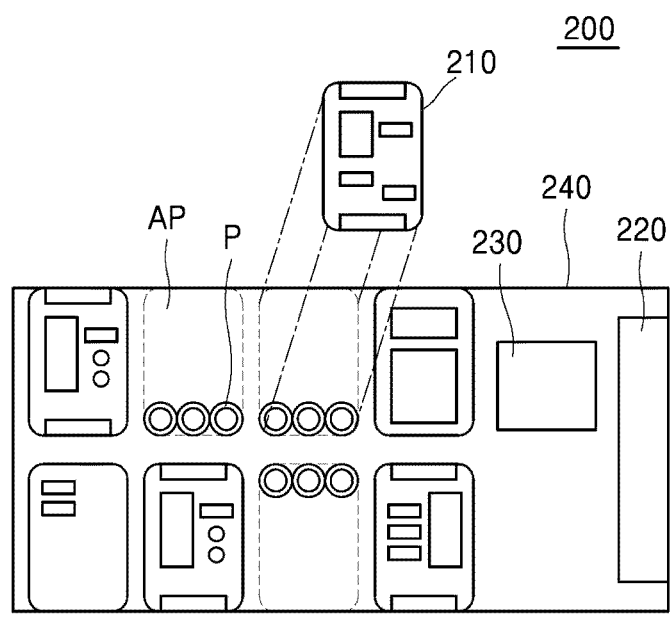
FIG. 2 is a configuration diagram illustrating a modular removable control board of FIG. 1.

FIG. 2 is a configuration diagram illustrating an adaptive IoT service system employing a removable hardware module.

Figure 1:
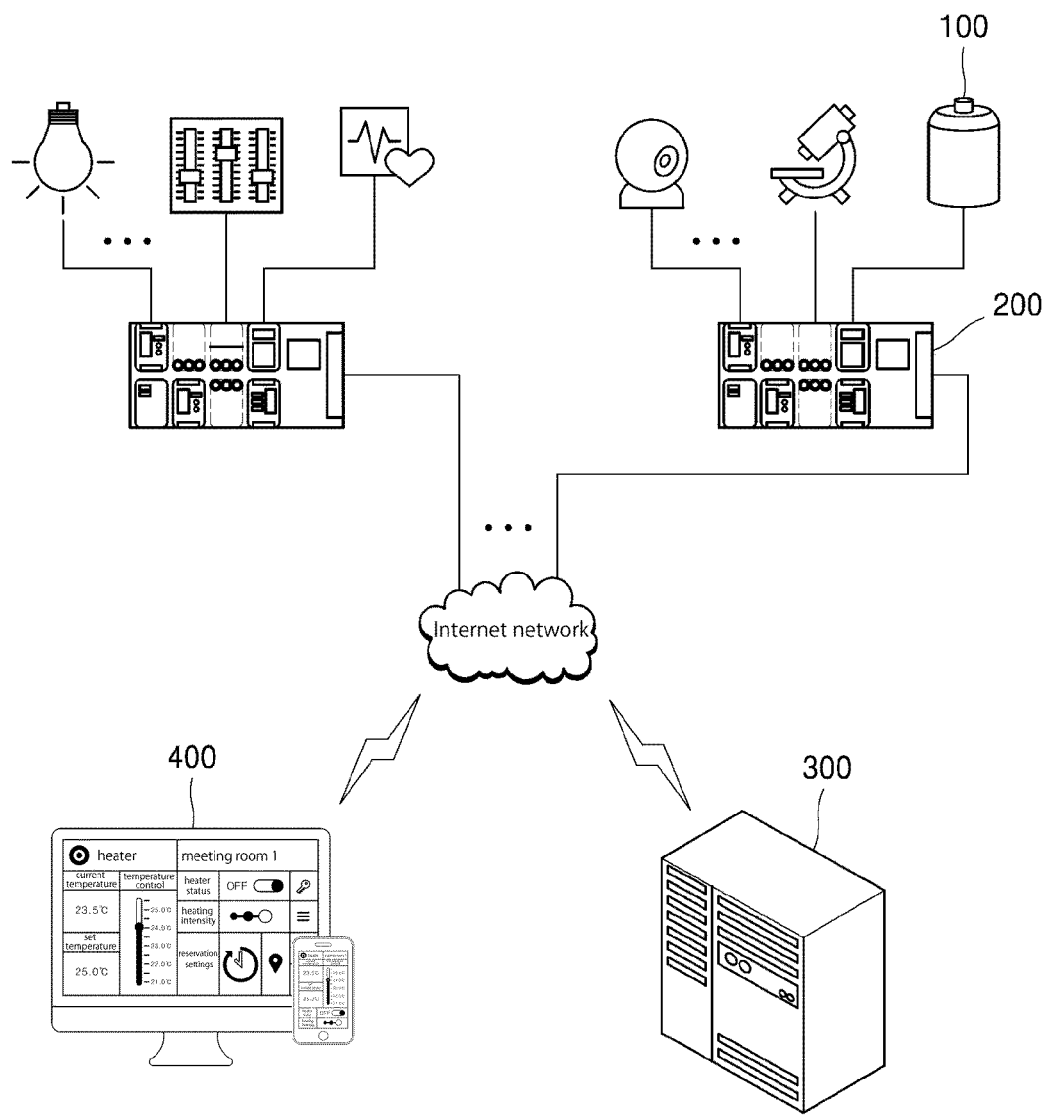
FIG. 1 is a configuration diagram illustrating an adaptive IoT service system employing a removable hardware module.

Referring to FIG. 1, according to one embodiment of the present invention, an Internet-of-things (IoT) service system includes an IoT device 100, a peripheral device that can be added to the IoT device, at least one control board 200, a management server 300, and a user terminal 400.

The IoT device 100 is a common device or thing in which IoT is incorporated. For example, the IoT device 100 may be one of home appliances such as CCTVs, lights, alarms, refrigerators, and air-conditioning devices. As another example, the IoT device 100 may be one of industrial devices used in industrial sites, such as various sensors, security devices, transformers, circuit breakers, energy storage devices, medical devices, and factory automation devices.

The control board 200 is configured such that hardware modules controlling the respective IoT devices 100 are mounted as sub-devices to a mainboard of the control board. That is, the control board 200 is structured such that the hardware modules controlling the respective IoT devices 100 can be mounted to and removed from the mainboard as necessary. Each of the hardware modules is configured to be mountable to and removable from the mainboard.

Each of the hardware modules is paired with at least one IoT device 100, thereby controlling the operation of the corresponding IoT device 100. That is, it serves as a programmable logical controller (PLC). That is, each hardware module includes a micro controller unit (MCU) such as a microprocessor, thereby performing sequential logic operations in accordance with a preset input program or by a user control command. Thus, each hardware module controls the overall operation of the associated IoT device 100 on the basis of the results of the logic operations.

Each of the hardware modules of the control board 200 is mounted to the mainboard in a manner that a connector including power supply terminals and communication interface terminals is electrically connected with a corresponding one of the slave connectors of the mainboard.

The mainboard of the control board includes a short-range/long-range communication interface module and a central processing unit (CPU). Thus, the mainboard supports the interworking among each of the hardware modules, the management server 300, and the user terminal 400 according to a preset sequence. The control board 200 includes the mainboard and at least one hardware module. The control board 200 will be further described later in greater detail with reference to the accompanying drawings.

The management server 300 performs an interface communication with at least one of the control boards 200 via the Internet. The management server 300 supports a control service such that each of the hardware modules of the control boards 200 can control the associated IoT device according to the user control command or the preset program and a real-time monitoring service such that the control status of each of the IoT device 100 can be monitored in real time.

When a new hardware module to control a specific IoT device 100 is mounted to the mainboard of the control board 200, the management server 300 procures and stores a drive program (so-called driver) and a control tool (or user interface tool) for controlling the operation of the added hardware module and the associated IoT device 100. The drive program and the control tool are then provided to the user terminal 400.

In the management server 300, various versions of drive programs and interface control tools for controlling the operation of each of the IoT device 100 are stored. Accordingly, when a new hardware module is added to the mainboard, a drive program and a control tool to control the operation of the new hardware module and its associated IoT device 100 are selected and provided to the user terminal 400. In addition, the management server 300 associates an application program in the user terminal 400 with the drive program and the control function of the control tool by software so that the IoT device 100 can be controlled by the application program, the control tool provided in the application program, and the control information.

When a hardware module is added to the mainboard of the control board 200 but the drive program or the control tool to control the hardware module and the associated IoT device 100 are not present within the management server 300, the management server 300 procures the drive program to control the operation of the hardware module and the IoT device 100 from the outside.

The user terminal 400 receives the drive program and the control tool for controlling the IoT device 100 that is newly added to the existing IoT environment and its associated hardware module, installs the drive program, and associates the control tool with the functions of the application program. The user can re-arrange the control tools added to the application program as necessary. Since each of the control tools is associated with the drive program, the user can control the IoT device in a remote-control manner.

FIG. 2 is a configuration diagram illustrating a modular removable control board of FIG. 1.

Referring to FIG. 2, the IoT service system of the present invention is configured to enable a hardware module 210 controlling an IoT device 100 to be mounted to and removed from a control board 200. In order to additionally connect a peripheral device 100 to the control board 200, a hardware module 210 controlling the peripheral device needs to be inserted into a slot formed in a mainboard of the control board 200. When inserted into the slot 200, a microprocessor 230 built in the control board 200 provides hardware-associated information including the type of the peripheral device 100 and the position of the slot into which the hardware module is inserted to the management server 300 via a communication module 220 so that the hardware-associated information stored in the management server 300 can be updated.

The control board 200 is configured such that each hardware module 210 is installed at a corresponding slave area AP within the mainboard 240 that performs interface communication and sequence control, thereby controlling the associated IoT device 100.

The mainboard 240 includes a short-range/long-range communication interface module 220, a CPU 230, at least one slave connector P, and the like. The mainboard 240 links each of the hardware modules 210, the management server 300, and the user terminal 400 to each other according to the predetermined sequence instructed by the CPU 230.

When the hardware module 210 is connected to one slave connector P within the mainboard 240, product information of the hardware module 210 added to the mainboard 240 and product information of the IoT device 100 to be controlled by the added hardware module 210 are transmitted to the management server 300. When the control board receives a control command or a control signal from the management server 300 or the user terminal 400, the control board relays it to the hardware module 210.

Each of the hardware modules 210 includes a power supply terminal and a communication interface terminal. When the hardware module 210 is mounted to the slave area AP within the mainboard 240, the connectors of the hardware module 210 are electrically connected with the slave connector P.

Each hardware module 210 paired with at least one IoT device 100 controls the operation of the paired IoT device 100 by executing operations that are pre-programmed in accordance with the user control command. To this end, each hardware module 210 includes a control circuit including at least one MCU.

Figure 3:
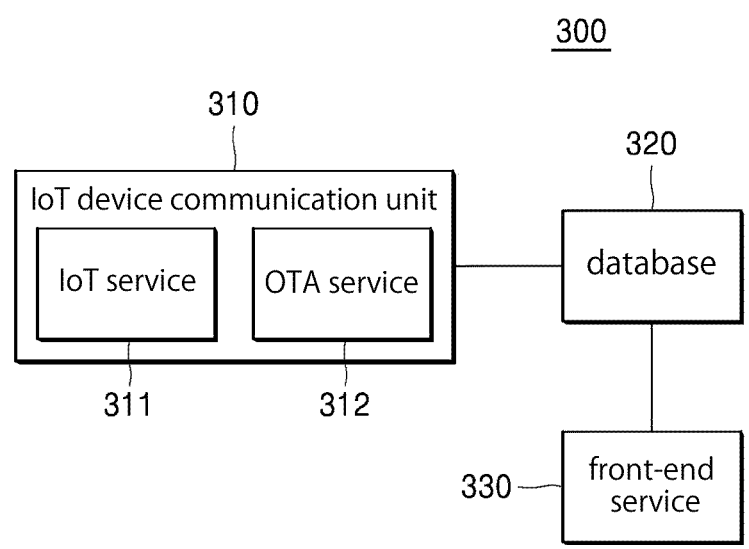
FIG. 3 is a configuration diagram illustrating a management server of FIG. 1.

FIG. 3 is a configuration diagram illustrating a management server of FIG. 1.

The management server 300 illustrated in FIG. 3 performs interface communication with at least one control board 200 and enables the hardware modules 210 of the control boards 200 to control the IoT devices 100 in accordance with the user control command or a preset command sequence written in a software program.

To this end, the management server 300 includes an IoT device communication unit 310, a database 320, and a front-end service support unit 330.

The IoT device communication unit 310 includes a wired/wireless Internet-protocol communication module supporting 4G networks, 5G networks, long term evolution (LTE) networks, Wi-Fi, Wi-Di, etc. Thus, the IoT device communication unit 310 can perform Internet-protocol communication with the control boards 200 and the user terminals 400.

The IoT device communication unit 310 relays an application program, a drive program, and a control tool to the user terminal 400. The IoT device communication unit 310 receives control information used to control the IoT device 100 from the control board 200 and transmits the control information to the database 320 and the front-end service support unit 330.

When the hardware module 210 is added to the control board 200, the IoT device communication unit 310 receives the product information regarding the added hardware module 210 and its associated IoT device 100 from the control board 200. The received product information is shared with a hardware link unit 330, a control tool link unit 340, and a driver support unit 350.

When a new IoT device is added to the exiting IoT environment and a new hardware module 210 for controlling the newly added IoT device 100 is added to the control board 200, the IoT service support unit 311 and the over-the-air (OTA) service support unit 312 support drive programs of the new IoT device 100 and the new hardware module 210 The drive program includes a drive source, an executable file, and a format for driving the IoT device 100 or the hardware module 210. For example, the drive programs may be software programs distributed by the manufacturers of the IoT device 100 and the hardware module 210.

The IoT service support unit 311 and the OTA service support unit 312 provide, in the form of a widget program, a control tool for controlling operation of a newly added IoT device 100 and a newly added hardware module 210. Specifically, the IoT service support unit 311 and the OTA service support unit 312 generate a control tool according to product information and provide the control tool to the user terminal 400 in the form of a widget program when the product information on the hardware module 210 and the IoT device 100 is input. Therefore, after the user executes the associated application program in the user terminal 400, the user can place the control tool within the application program by displaying a widget program screen. The control tool link unit 350 generates a control signal or an operation command according to the user control command that is input by using the control tool of the application program.

The user terminal 400 connects to the front-end service support unit 330 of the management server 300 via the Internet. The front-end service support unit 330 preferentially supports a web-based service scheme, but is not constrained by a communication protocol.

The unique identification number of a device owned by the user is stored in the database 320 and the real-time or cumulative data of the device is also stored in the database 320. Therefore, the user can browse the information on the IoT device and remotely control the information from his or her user terminal 400.

In the user terminal 400, the user interface is automatically generated by the front-end service support unit 330 on the basis of the IoT device type information (i.e., type of the IoT device 100 and location of the slot of the hardware module) stored in the database 320. When a user inputs a command for controlling the IoT device into the database 320 by using the widget automatically generated in the user terminal 400, the IoT service support unit 311 detects a change in the records stored in the database 320 and notifies the control board 200 of the change. In this way, the user can control the IoT device remotely.

The IoT device communication unit 310 applies the drive program so that the IoT device 100 can be controlled by the hardware module 210 added to the control board 200. That is, the hardware link unit 330 executes the drive program in the hardware module 210 so that the hardware module 210 can be associated with the application program control tool in the user terminal 400. At this time, the program commands are mapped such that the hardware module 210 can be operated according to a control signal or an operation command generated in accordance with the user control command that is input through the application program control tool of the user terminal 400. Accordingly, each of the hardware modules 210 mounted on the control board 200 performs a pre-programmed operation upon receiving the control signal and the control command, thereby controlling the operation of the IoT device 100.

On the other hand, the database 320 receives and stores drive programs provided by the manufacturers, on the basis of product information for each of the IoT devices 100 and each of the hardware modules 210. In addition, the database 320 provides the drive programs that are stored in association with the product information, to the IoT device communication unit 310 at request of the IoT device communication unit 310.

Figure 4:
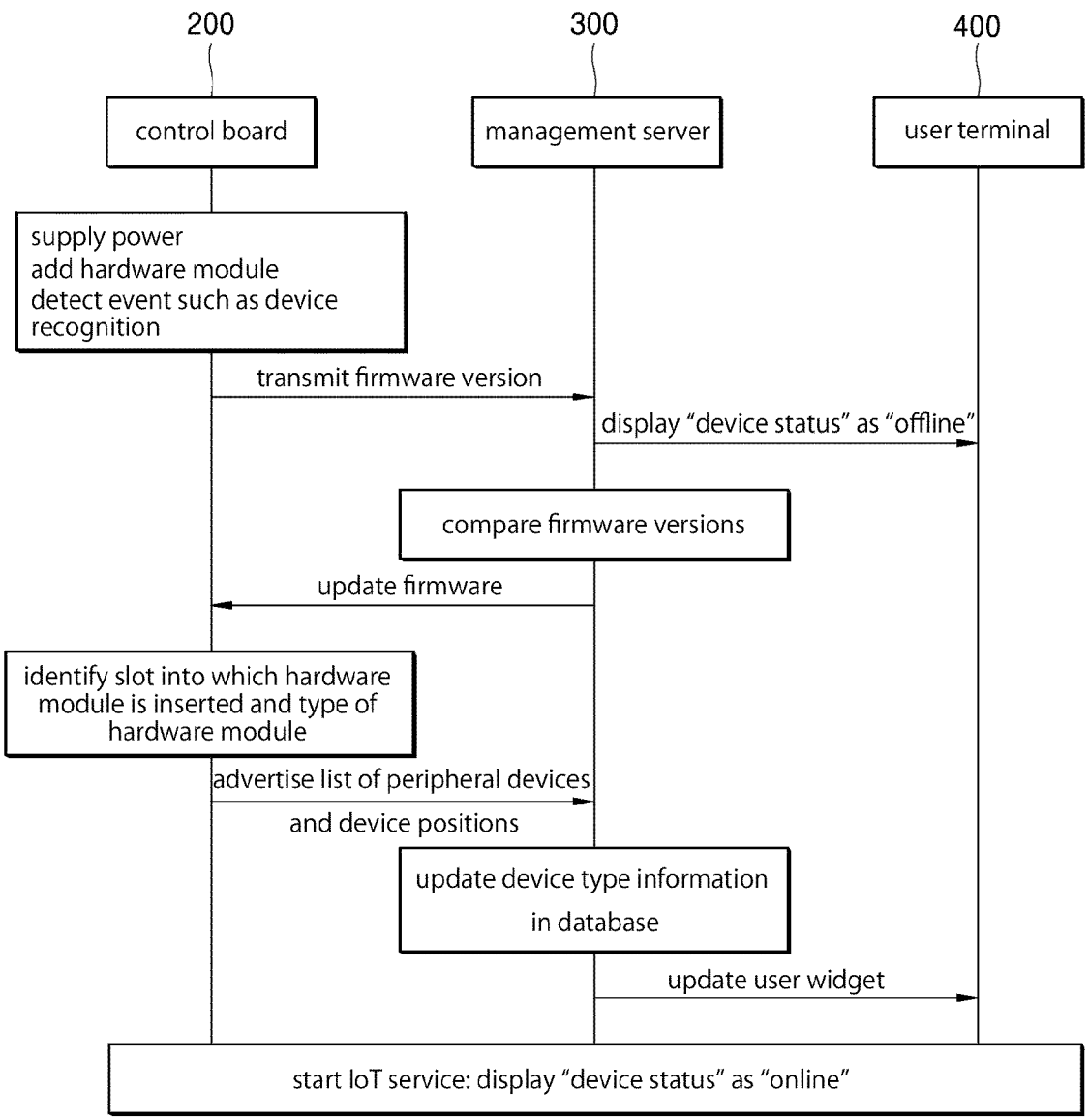
FIG. 4 is a flowchart illustrating a back-end service execution method performed by the management server of FIG. 1.

FIG. 4 is a flowchart illustrating a back-end service execution method of the management server of FIG. 1.

Specifically, FIG. 4 is a diagram illustrating: an automatic updating process in which the firmware of the microprocessor 230 is automatically updated via the OTA service support unit 312, and a type information posting process in which the type information of the hardware module 210 inserted into a specific slot of the mainboard 240 of the control board 200 is posted.

When an event occurs, for example, the system manager updates information, such as a firmware version, in the database 320 stored in the management server and reboots the control board 200, or when the firmware of the microprocessor 230 recognizes that the hardware module 210 inserted in the specific slot is replaced, the OTA service support unit 312 compares the firmware version of the microprocessor 230 of the control board 200 and the firmware version recorded in the database 320.

When the firmware version recorded in the database 320 is newer than the firmware version in the microprocessor 230 of the control board 200, an OTA boot loader of the microprocessor 230 is executed. Thus, the firmware in the microprocessor 230 is automatically updated through communication with the OTA service support unit 312.

When both of the firmware versions are identical, the firmware updating is not performed. Next, the control board 200 creates a list of IoT devices to be controlled by the control board 200 on the basis of the information on the hardware modules 210 mounted to the control board 200, and transmits the list to the management server 300. The updating of the firmware version recorded in the database 320 is performed by the IoT service support unit 311. Herein, a process in which the control board 200 notifies the management server 300 of the information on the IoT device 100 is called an advertisement.

The widget displayed in the user terminal 400 is automatically changed by an advertisement packet transmitted to the management server 300 from the control board 200 when the IoT device 100 is booted up. The OTA boot loading function is to update the control sequence of the supportable IoT devices 100 and to perform automatic control over the IoT devices 100.

When an additional firmware is loaded into the microprocessor 230 of the control board 200, the IoT devices can be only manually controlled via the widget on the user terminal 400.

Meanwhile, the IoT device communication unit 310 automatically selects a control tool suitable for control of the IoT device 100 on the basis of newly input product information in various ways, and provides the control tool to the user terminal 400 in the form of a widget program. The control tools selected by the user via the widget program are applied to the control screen of the application program so that the operation of the IoT device 100 can be controlled through the manipulation of the control tools.

Figure 5:
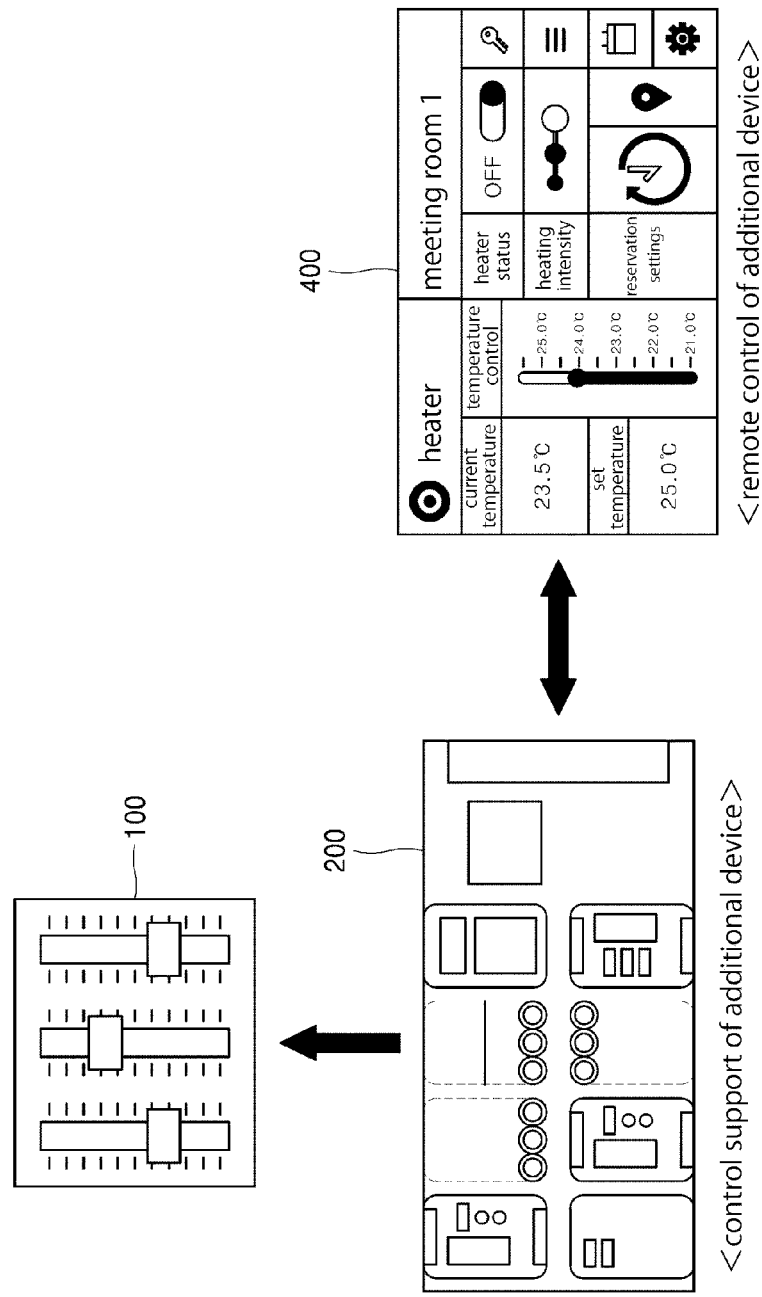
FIG. 5 is a diagram illustrating a way in which a user terminal, a hardware module, and an IoT device operate in conjunction with each other.

FIG. 5 is a diagram illustrating a way in which a user terminal, a hardware module, and an IoT device operate in conjunction with each other.

As illustrated in FIG. 5, the drive programs of the hardware module 210 and the IoT device 100 that are newly added are installed in the user terminal 400. Therefore, after the association operation is performed once by the hardware link unit 330, the IoT device 100 can be controlled remotely from the user terminal 400.

When the drive programs of the hardware module 210 and the IoT device 100 that are newly added are executed in the user terminal 400, the hardware module 210 and the application program control tool in the user terminal 400 are associated. In this state, a control signal or an operation command generated in accordance with the user control command that is input via the application program control tool in the user terminal 400 is transmitted to the hardware module 210. When the hardware module 210 receives the control signal or command from the main board 240, the hardware module 210 associates the control signal or command with a program command, thereby performing a preset programmed operation in accordance with the control signal or command. In this way, the hardware module 210 can control the operation of the associated IoT device 100.

Figure 6:
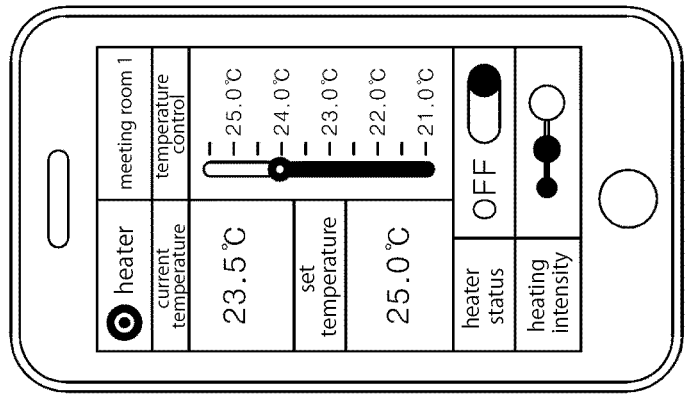
FIG. 6 is a diagram illustrating an application example in which an application program control tool is applied in the same manner in multiple user terminals.
Figure 6:
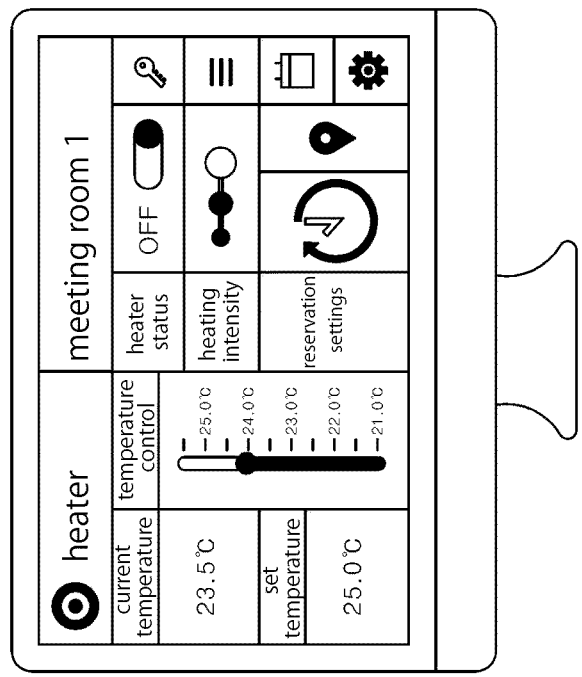

FIG. 6 is a diagram illustrating an application example in which an application program control tool is executed in multiple user terminals.

As illustrated in FIG. 6, the user terminal 400 may be a personal PC, a tablet PC, or a mobile communication device such as a smart phone. Accordingly, the IoT device communication unit 310 supports both a web-type application program and an app-type application program.

When the user controls the IoT device 100 or adds a control tool by executing a web-type application program on a private personal computer (PC) with the support of the IoT device communication unit 310, the results of the control performed through the web-type application program are simultaneously applied to the app-type application program.

For the monitoring function supported by the IoT device communication unit 310, the same also applies. That is, by either the web-type application program or the app-type application program, it is possible to check the control operation and the association operation between the hardware module 210 and each of the IoT device 100 and the application program.

The user selectively executes a web-type application program or an app-type application program to check whether the association operation and the control operation between the hardware module 210 and the IoT device 100 is smooth and whether the association operation between the hardware module 210 and the application program is normal. Accordingly, the user can control the operation of the IoT device 100 in real time by using the control tool of the web-type or app-type application program and check the control result of the IoT device 100 in real time.

As described above, an IoT implementation system and method using the control board 200 according to one embodiment of the present invention provides a function: when an IoT device 100 and its associated hardware module 210 are newly added to an existing IoT environment, the IoT device 100 and the hardware module 210 that are newly added can automatically interwork with an application program installed in a user terminal.

In particular, the system and method allow a user oneself to directly mount an IoT device 100 and its associated hardware module 200 that are already in possession or purchased to the control board 200, thereby minimizing labor and cost.

In addition, with the use of the system and method, when an IoT device 100 and its associated hardware module 210 are additionally mounted on the control board 200, an interface control tool is automatically added to an application program installed in a user terminal so that the application program and drive programs of the IoT device 100 and the hardware module 210 are automatically linked. Therefore, it is easy to control a user interface. Therefore, user satisfaction and ease of use of an IoT service are greatly improved.

While the present invention has been particularly illustrated and described with reference to exemplary embodiments thereof, it is to be understood that the present invention is not limited to the disclosed exemplary embodiments, but, on the contrary, modifications thereto are possible. Accordingly, the spirit of the present invention should be understood only by the appended claims, and it is appreciated that all equivalents or equivalent modifications thereof fall within the scope of the present invention.

The invention claimed is:

1. An adaptive Internet-of-things (IoT) service system employing a removable hardware module, the system comprising:
    a control board including a mainboard configured such that the removable hardware module for controlling a peripheral device connected with an existing IoT device is mountable to and removable from the mainboard;
    a management server configured to store hardware-related information including a type and installation position of the removable hardware module mounted on the mainboard of the control board and to update the hardware-related information when a new IoT device is added or a change in the existing IoT device occurs; and
    a user terminal configured to receive a drive program and control information from the management server and to support remote-controlling of the added IoT device by installing the received drive program, or adding or applying the drive program and the control information to an application program installed in the user terminal.

2. The system according to claim 1, wherein the removable hardware module is mountable to or removable from a slave area of the mainboard of the control board,
    wherein the removable hardware module is mounted in a manner that a connector including a power supply terminal and a communication interface terminal is electrically connected with a slave connector on the mainboard.

3. The system according to claim 1, wherein the management server comprises:
    an IoT device communication unit including a wired/wireless Internet communication module; and
    a front-end service support unit that automatically provides a widget to the IoT device communication unit on the basis of type information of the control board,
    wherein the management server performs Internet-protocol communication with the control board and the user terminal via the IoT device communication unit, provides the application program for controlling the IoT device to the user terminal, and provides the drive program for controlling operation of the added IoT device.

4. The system according to claim 1, wherein the management server further comprises:
    a communication unit including a wired/wireless communication module to support an IoT service and an OTA service by performing Internet-protocol communication with the control board; and
    a database used to record and manage information including an identification number of the control board, a list of the peripheral device, a firmware version, user personal data, real-time data and cumulative data transmitted from the control board, and a user control command that is input by the user and is transmitted to the control board in real time.

* * * * *